(12) United States Patent
Wan

(10) Patent No.: US 9,292,928 B2
(45) Date of Patent: Mar. 22, 2016

(54) DEPTH CONSTRAINED SUPERPIXEL-BASED DEPTH MAP REFINEMENT

(71) Applicant: CANON KABUSHIKI KAISHA, Tokyo (JP)

(72) Inventor: Ernest Yiu Cheong Wan, Carlingford (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/317,051

(22) Filed: Jun. 27, 2014

(65) Prior Publication Data

US 2015/0003725 A1    Jan. 1, 2015

(30) Foreign Application Priority Data

Jun. 28, 2013 (AU) .............................. 2013206597

(51) Int. Cl.
*G06K 9/00* (2006.01)
*G06K 9/34* (2006.01)
*G06T 7/00* (2006.01)

(52) U.S. Cl.
CPC ..... *G06T 7/0081* (2013.01); *G06T 2207/10028* (2013.01); *G06T 2207/20144* (2013.01)

(58) Field of Classification Search
USPC ........................................................ 382/154
See application file for complete search history.

(56) References Cited

U.S. PATENT DOCUMENTS

2009/0290811 A1* 11/2009 Imai ...................... G06T 3/4061
  382/285
2011/0249190 A1* 10/2011 Nguyen ................. H04N 5/272
  348/708

(Continued)

OTHER PUBLICATIONS

Schick, A., et al., "Improving foreground segmentations with probabilistic superpixel Markov random fields", In Computer Vision and Pattern Recognition Workshops (CVPRW), Jun. 2012 IEEE Computer Society Conference, pp. 4321-4325.

(Continued)

*Primary Examiner* — Kathleen Y Dulaney
(74) *Attorney, Agent, or Firm* — Canon USA Inc. IP Division

(57) ABSTRACT

A method of forming a refined depth map $D_R$ of an image I using a binary depth map $D_I$ of the image, said method comprising segmenting (315) the image into a superpixel image $S_{REP}$, defining (330) a foreground and a background in the superpixel image $S_{REP}$, to form a superpixel depth map $D_S$, intersecting (450) the respective foreground and the background of the superpixel depth map $D_S$ with the binary depth map $D_I$ determined independently of the superpixel image $S_{REP}$, to define a trimap T consisting of a foreground region, a background region and an unknown region, and forming the refined binary depth map $D_R$ of the image from the trimap T by reclassifying (355, 365) the pixels in the unknown region as either foreground or background based on a comparison (510) of the pixel values in the unknown region with pixel values in at least one of the other trimap regions.

16 Claims, 9 Drawing Sheets

(56) References Cited

U.S. PATENT DOCUMENTS

| | | | |
|---|---|---|---|
| 2012/0195492 A1* | 8/2012 | Ali | G06T 3/4007 382/154 |
| 2012/0200669 A1* | 8/2012 | Lai | G06T 5/002 348/43 |
| 2014/0219547 A1* | 8/2014 | Tuzel | G06T 3/4053 382/154 |
| 2015/0030233 A1* | 1/2015 | Nasiopoulos | G06T 7/0051 382/154 |

OTHER PUBLICATIONS

Soh, Y., et al., "Superpixel-based depth image super-resolution", In Society of Photo-Optical Instrumentation Engineers (SPIE) Conference Series, Feb. 2012.

He, K, et al., "Guided image filtering", In Proceedings of the 11th European conference on Computer vision: Part I, Heraklion, Crete, Greece, Springer-Verlag: Berlin, Heidelberg, 2010; p. 1-14.

Liu, Z., et a;., "Automatic segmentation of focused objects from images with low depth of field", Pattern Recognition Letters, May 2010, pp. 572-581, vol. 31, Issue 7.

* cited by examiner

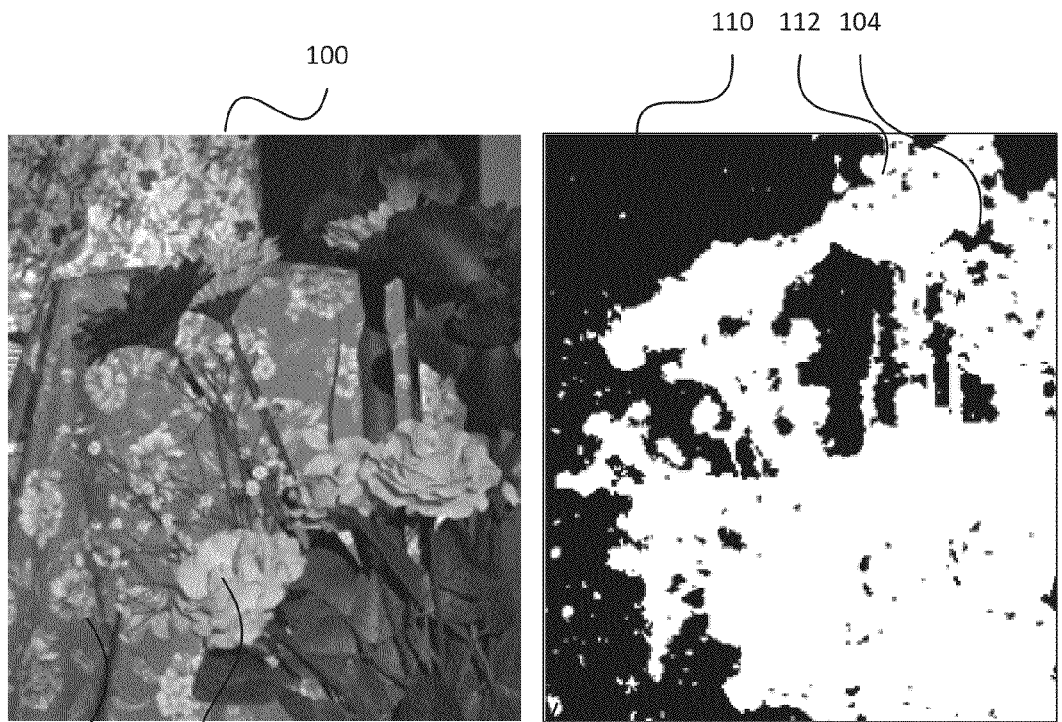
Fig. 1A
Fig. 1B
Fig. 1C

DEPTH CONSTRAINED SUPERPIXEL-BASED DEPTH MAP REFINEMENT

REFERENCE TO RELATED PATENT APPLICATION(S)

This application claims the benefit under 35 U.S.C. §119 of the filing date of Australian Patent Application No. 2013206597, filed 28 Jun. 2013, hereby incorporated by reference in its entirety as if fully set forth herein.

TECHNICAL FIELD

The current invention relates to digital image processing and, in particular, to the refinement of a depth map produced using depth-from-defocus (DFD) methods.

BACKGROUND

Depth-from-defocus (DFD) methods measure depth by comparing an amount of blur in corresponding tiles of two or more images taken with different camera settings such as different focus or different aperture settings. The size of the tiles affect the depth estimates. The larger the size of the tiles the less noisy are the depth estimates over regions of similar depth. On the other hand, the spatial resolution at depth boundaries is reduced.

Along depth boundaries, the DFD assumption of constant depth (over a tile) is also violated and the depth estimates are inaccurate. DFD methods also generate very noisy or no depth estimates in low texture regions. As a result, DFD depth maps are often refined to:

reduce noise in depth estimates, and
align depth boundaries with object edges.

Superpixel segmentation segments an image into superpixels which are collections of connected pixels with similar characteristics such as colour and texture. The boundaries of the superpixels often (but not always) align well with object edges. Their use in depth map refinement, in particular depth boundary refinement, can be advantageous.

Superpixel segmentation has been applied to both low resolution depth maps and their corresponding high resolution images. Heuristics are then used to transfer the boundaries of the superpixels of the high resolution image to the corresponding superpixels of the depth map to improve the resolution of the depth boundaries in the depth map. This approach assumes that the superpixel segmentation is correct. However, superpixel boundaries do not always align with object edges. At depth boundaries where the colour and/or texture are similar across the boundary, a superpixel may include segments of different objects on either side of the boundary. Another problem with superpixel segmentation is that fine structures such as hair strands, flower stems, etc, in an image that are of scale finer than the superpixels, are combined with other objects to form a superpixel and cannot be separated.

Imaging matting has been used to refine the depth boundaries obtained from superpixels. Image matting attempts to separate foreground objects of an image from the background of the image. Imaging matting typically involves estimation of an alpha matte which specifies the full or partial pixel coverage of the background by foreground objects. An image, I, can be represented as a combination of a foreground image, F, and a background image, B, such that the colour value of a pixel p, $I_p$, is given by $$I_p = \alpha_p F_p + (1-\alpha_p) B_p \qquad (1)$$

where $\alpha_p$ is the alpha value of p (in the alpha matte), and $F_p$, $B_p$ are the colour values of the foreground image, F, and the background image, B, at pixel p, respectively.

To perform alpha matting, a trimap is typically first defined. The trimap divides the image into three non-overlapping regions, namely a foreground region in which the image is believed, with high probability, to be foreground, a background region where the image is believed, with high probability, to be background, and an unknown region where it is uncertain how much the foreground and the background images contribute to the pixels' colour. The alpha value of all pixels in the foreground region are set to 1 and the alpha value of all pixels in the background region are set to 0. Only the alpha value of the pixels in the unknown regions, these alpha values falling in the range of 0 to 1, are estimated by comparing the colour of the pixels with sample pixels from the nearby foreground and background regions. The estimated alpha value for each pixel measures the relative contribution of the foreground image and the background image to the pixel. In depth refinement, the estimated alpha value can be used as a measure of the probability of a pixel being part of the foreground. By thresholding the estimated alpha values, pixels in the unknown region can be classified as foreground or background. For instance, pixels with estimated alpha above 0.5 can be classified as foreground while pixels with estimated alpha equal to or less than 0.5 can be classified as background.

For superpixel based depth refinement, the trimap required for image matting can be obtained by applying heuristics to select different subsets of the superpixels obtained from a high resolution image for the foreground, background and unknown region of the trimap.

For instance, depth obtained from a low-resolution depth map such as 110 in FIG. 1B can be averaged over each superpixel such as 201 in a superpixel representation 200 of the high resolution image 100. Two depth thresholds, namely a lower and an upper depth threshold, can be pre-defined or dynamically determined to divide the superpixel segmentation into the three regions of the trimap. Superpixels whose average depth is lower (ie less than) than the lower threshold will be defined as foreground, superpixels whose average depth is higher (ie greater than) than the upper threshold will be defined as the background, while the remaining superpixels are defined as unknown.

Selecting different subsets of the superpixels for the three regions of a trimap of the high resolution image presents a number of difficult problems. First of all, if the foreground superpixels are not selected correctly, that is, if they are not 100% foreground, then superpixel segmentation errors cannot be corrected by the subsequent image matting. This is especially the case for small background regions surrounded by a foreground object or vice versa. Those regions can become hidden away and locked in the interior of a superpixel and the regions would thus be given the same foreground or background assignment of the surrounding pixels.

If the scale (ie the average size) of the superpixels is set to a small value, more superpixels will be wrongly assigned to the foreground and background at depth boundaries, due to the low resolution depth map. This can severely affect the accuracy of the alpha matte. If the scale of the superpixels is set to a large value, the unknown region will be unnecessary large, decreasing the image matting accuracy since the foreground and background samples for computing the alpha values have to be picked from adjacent foreground and background superpixels that are further away from an unknown pixel in the superpixel in question. The larger unknown region also increases the amount of computation required.

SUMMARY

It is an object of the present invention to substantially overcome, or at least ameliorate, one or more disadvantages of existing arrangements.

Disclosed are arrangements, referred to as Sub-Superpixel Image Matting Depth Refinement (SSIMDR) arrangements, which seek to address the depth refinement problem by applying image matting to a superpixel representation of an image, to further separate foreground objects of the image from its background after determining roughly the boundaries of the foreground objects from a superpixel segmentation of the image and an associated low-resolution binary depth map, while avoiding limiting the image matting operation by the scale of the superpixels.

According to a first aspect of the present disclosure, there is provided a method of forming a refined depth map $D_R$ from a high-resolution image I of a scene and a low-resolution depth map $D_I$ of said image, said method comprising the steps of:
segmenting the high-resolution image into a plurality of superpixels, being connected sets of pixels of the high-resolution image I, to form a superpixel segmented image $S_{REP}$;
  determining at least one depth measure associated with the superpixels in the superpixel segmented image $S_{REP}$ to thereby form a superpixel depth map $D_S$ having a foreground region and a background region;
  intersecting the foreground region and the background region of the superpixel depth map $D_S$ with the respective foreground region and the background region of the low-resolution binary depth map $D_I$ to define a trimap T having a foreground region, a background region and an unknown region; and
  reclassifying pixels in the unknown region of the trimap as either foreground or background pixels of the trimap based on a comparison of the pixel values in the unknown region of the trimap with pixel values in at least one of the other regions of the trimap, thereby forming said refined depth map $D_R$.

According to another aspect of the present disclosure, there is provided an apparatus for forming a refined depth map $D_R$ from a high-resolution image I of a scene and a low-resolution depth map $D_I$ of said image, said apparatus comprising:
  a processor; and
  a software executable program configured to direct the processor to execute a method comprising the steps of:
  segmenting the high-resolution image into a plurality of superpixels, being connected sets of pixels of the high-resolution image I, to form a superpixel segmented image $S_{REP}$;
  determining at least one depth measure associated with the superpixels in the superpixel segmented image $S_{REP}$ to thereby form a superpixel depth map $D_S$ having a foreground region and a background region;
  intersecting the foreground region and the background region of the superpixel depth map $D_S$ with the respective foreground region and the background region of the low-resolution binary depth map $D_I$ to define a trimap T having a foreground region, a background region and an unknown region; and
  reclassifying pixels in the unknown region of the trimap as either foreground or background pixels of the trimap based on a comparison of the pixel values in the unknown region of the trimap with pixel values in at least one of the other regions of the trimap, thereby forming said refined depth map $D_R$.

According to still another aspect of the present disclosure, there is provided a non-transitory computer readable medium storing a software executable program configured to direct a processor to execute a method for forming a refined depth map $D_R$ from a high-resolution image I of a scene and a low-resolution depth map $D_I$ of said image, said method comprising the steps of:
  segmenting the high-resolution image into a plurality of superpixels, being connected sets of pixels of the high-resolution image I, to form a superpixel segmented image $S_{REP}$;
  determining at least one depth measure associated with the superpixels in the superpixel segmented image $S_{REP}$ to thereby form a superpixel depth map $D_S$ having a foreground region and a background region;
  intersecting the foreground region and the background region of the superpixel depth map $D_S$ with the respective foreground region and the background region of the low-resolution binary depth map $D_I$ to define a trimap T having a foreground region, a background region and an unknown region; and
  reclassifying pixels in the unknown region of the trimap as either foreground or background pixels of the trimap based on a comparison of the pixel values in the unknown region of the trimap with pixel values in at least one of the other regions of the trimap, thereby forming said refined depth map $D_R$.

According to still another aspect of the present disclosure, there is provided a method of forming a refined depth map $D_R$ of a high-resolution image I using a low-resolution depth map $D_I$ of the image, said method comprising the steps of:
  segmenting the high-resolution image into a plurality of superpixels to form a superpixel segmented image $S_{REP}$, said superpixels being connected sets of pixels of the high-resolution image I;
  defining a foreground region and a background region in the superpixel segmented image $S_{REP}$, to form a superpixel depth map $D_S$, based on at least one depth measure associated with the superpixels in the superpixel segmented image $S_{REP}$;
  intersecting the respective foreground regions and the background regions of the superpixel depth map $D_S$ with the low-resolution depth map $D_I$ to define a trimap T consisting of a foreground region, a background region and an unknown region, said low-resolution depth map $D_I$ being determined independently of the superpixel segmented image $S_{REP}$; and
  forming a refined binary depth map $D_R$ of the image from the trimap T by reclassifying pixels in the unknown region as either foreground or background based on a comparison of the pixel values in the unknown region with pixel values in at least one of the other trimap regions.

According to still another aspect of the present disclosure, there is provided an apparatus for forming a refined depth map $D_R$ of a high-resolution image I using a low-resolution depth map $D_I$ of the image, said apparatus comprising:
  a processor; and
  a software executable program configured to direct the processor to execute a method comprising the steps of:
  segmenting the high-resolution image into a plurality of superpixels to form a superpixel segmented image $S_{REP}$, said superpixels being connected sets of pixels of the high-resolution image I;

defining a foreground region and a background region in the superpixel segmented image $S_{REP}$, to form a superpixel depth map $D_S$, based on at least one depth measure associated with the superpixels in the superpixel segmented image $S_{REP}$;

intersecting the respective foreground regions and the background regions of the superpixel depth map $D_S$ with the low-resolution depth map $D_I$, to define a trimap T consisting of a foreground region, a background region and an unknown region, said low-resolution depth map $D_I$ being determined independently of the superpixel segmented image $S_{REP}$; and forming a refined binary depth map $D_R$ of the image from the trimap T by reclassifying pixels in the unknown region as either foreground or background based on a comparison of the pixel values in the unknown region with pixel values in at least one of the other trimap regions.

According to still another aspect of the present disclosure, there is provided a non-transitory computer readable medium storing a software executable program configured to direct a processor to execute a method for forming a refined depth map $D_R$ of a high-resolution image I using a low-resolution depth map $D_I$ of the image, said method comprising the steps of:

segmenting the high-resolution image into a plurality of superpixels to form a superpixel segmented image $S_{REP}$, said superpixels being connected sets of pixels of the high-resolution image I;

defining a foreground region and a background region in the superpixel segmented image $S_{REP}$, to form a superpixel depth map $D_S$, based on at least one depth measure associated with the superpixels in the superpixel segmented image $S_{REP}$;

intersecting the respective foreground regions and the background regions of the superpixel depth map $D_S$ with the low-resolution depth map $D_I$, to define a trimap T consisting of a foreground region, a background region and an unknown region, said low-resolution depth map $D_I$ being determined independently of the superpixel segmented image $S_{REP}$; and forming a refined binary depth map $D_R$ of the image from the trimap T by reclassifying pixels in the unknown region as either foreground or background based on a comparison of the pixel values in the unknown region with pixel values in at least one of the other trimap regions.

According to another aspect of the present invention, there is provided a computer program product including a computer readable medium having recorded thereon a computer program for implementing any one of the methods described above.

Other aspects of the invention are also disclosed.

BRIEF DESCRIPTION OF THE DRAWINGS

One or more embodiments of the invention will now be described with reference to the following drawings, in which:

FIGS. 1A, 1B and 1C illustrate an example image, its associated binary depth map and the misalignment between the depth boundary in FIG. 1B and the object edges in FIG. 1A. when current depth estimation methods are used;

DETAILED DESCRIPTION INCLUDING BEST MODE

Introduction

Figure 2A:
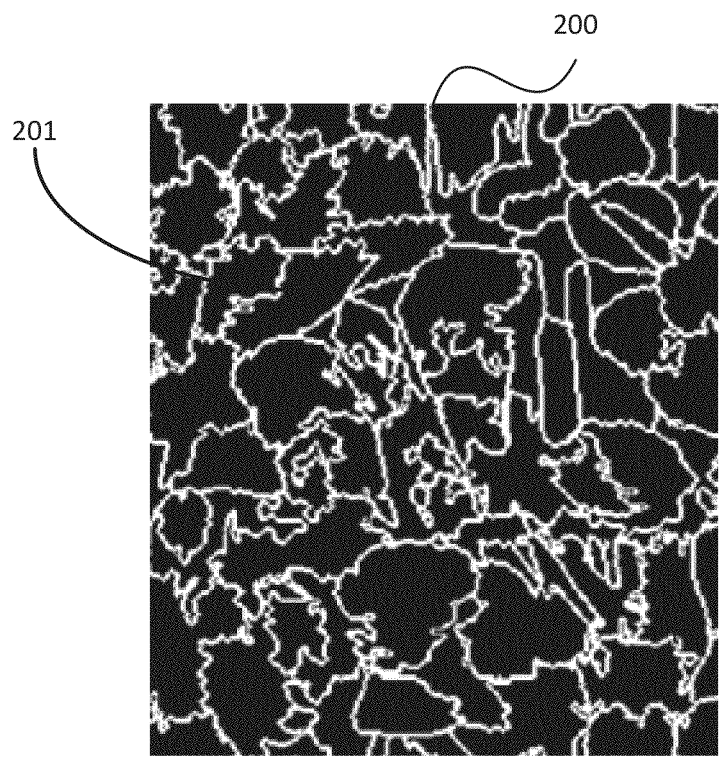
FIGS. 2A and 2B illustrate a superpixel segmentation of the example image of FIG. 1A and depicts segmentation errors and loss of thin structures associated with superpixel segmentation.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and that above relating to prior art arrangements relate to discussions of systems which may form public knowledge through their use. Such discussions should not be interpreted as a representation by the present inventor(s) or the patent applicant that such documents or devices in any way form part of the common general knowledge in the art.

The present description describes methods of refining a low resolution, multi-layer depth map (such as 110 in FIG. 1B) of a high resolution image (such as 100 in FIG. 1A) so as to improve the spatial resolution of the depth map. The described methods typically offer improved depth accuracy and improved alignment of depth boundaries with object edges while reducing the amount of computation required by limiting the refinement to a small region of the depth map.

The following glossary defines key variables and terms used in this specification:

GLOSSARY

I the image in question;
F the foreground image of I;
B the background image of I;
$I_p$ the colour value of pixel p in the image I
p the pixel in question;
$\alpha_p$ the alpha value of p;
$F_p$ the foreground image of the image I;
$B_p$ the background image of the image I;
DFD Depth-from-defocus;
$D_I$ a binary depth map of the image I;
$S_{rep}$ superpixel representation of the image I;
S piecewise constant superpixel depth map;
T a trimap;

$D_R$ refined binary depth map;
$D_B$ intermediate binary depth map;
⊖ morphological erosion operator;
$E_4$ is a structuring element used for morphological operation;
⊕ morphological dilation operator;
∩ is the intersection operator;
$D_S$ is a superpixel binary depth map;
$C_S$ is a superpixel depth map binarisation curve;
$E_f$ is a structuring element used for morphological operation;
|G| is the number of pixels in an image G;
FG(T) the foreground region of the trimap T;
FG($D_B$) the foreground region of the intermediate depth map $D_B$;
BG(T) the background region of the trimap T;
BG($D_B$) the background region of the intermediate depth map $D_B$;
unknown(T) the unknown region of the trimap T;
M binary mask used for guided feathering;
$W_p$ probability that a pixel p is in the foreground;
Q a circular local window used to establish $W_p$;
m the diameter of the circular local window Q;
$k_2$ the number of foreground pixels used to establish $W_p$;
$\overline{dist_c(p,f)}$ average colour distance between the pixel p and the foreground pixel f;
$\overline{dist_c(p,b)}$ average colour distance between the pixel p and the background pixel b;
W probability mask;
$\hat{D}_{pos}$ is the Guided Filter output when the image I is used as the guidance image;
$\hat{D}_{neg}$ is the Guided Filter output when the negative image of image I is used as the guidance image;
$\tilde{I}$ is the negative image of I as a guidance image;
$\hat{D}$ is an averaged depth map;
$D_{sm}$ is a smoothed depth map;

Context

While the following description of the present SSIMDR arrangement uses a binary (foreground/background) depth map as the input depth map, it should be clear to those skilled in the art that the method of the SSIMDR arrangement can be easily extended to multi-layer depth maps by refining successive pairs of layers of a multi-level depth map in turn.

Depth Errors

Most depth estimation methods including Depth-from-defocus (DFD) methods produce noisy depth maps that are of a lower resolution than the actual high-resolution image.

FIG. 1B shows a binary depth map 110 of an image 100 depicted in FIG. 1A. The binary depth map 110 is produced using a current DFD method. The binary depth map 110 depicts foreground objects in white and background objects in black. The image 100 shows a bunch of flowers 102 against a floral drape 103 that forms a backdrop. While the binary depth map 110 shows the bunch of flowers 112 in the foreground, the depth map 110 is noisy and the outline of the foreground region is aligned poorly with the actual edges of the flowers. The binary depth map 110 has patches such as 104, where the foreground is incorrectly labelled as background, and patches such as 116 where the background is incorrectly labelled as foreground.

An image 120 in FIG. 1C shows only the regions of the image 100 that are labelled as foreground in the binary depth map 110. The misalignment of the (foreground/background) depth boundary and edges of the (flower) objects is clearly shown.

As typically shown by a patch 122, the defined foreground region extends beyond the edges of an object into the adjacent background region creating a 'halo' around the object. This is because DFD methods measure depth by comparing the amount of blurring or, equivalently, the magnitude of high spatial frequency components, observed in corresponding tiles of two or more images taken with different camera settings. A more blurred image has weaker high frequency components than a less burred image. When a tile contains regions of different depths, the measured depth is often biased toward the depth of the region with stronger high frequency components which, in most cases, is the sharper foreground region (as in the case of the patch 122). Nevertheless, it is possible that a blurred but highly textured background region possesses stronger high frequency components than an adjacent sharp but weakly textured foreground object. In this case, the background region extends across the edges of the object into the foreground object.

Superpixel Segmentation

Superpixel segmentation segments an image into a large number of superpixels which are collections of connected pixels with similar characteristics such as colour and texture.

Figure 2B:
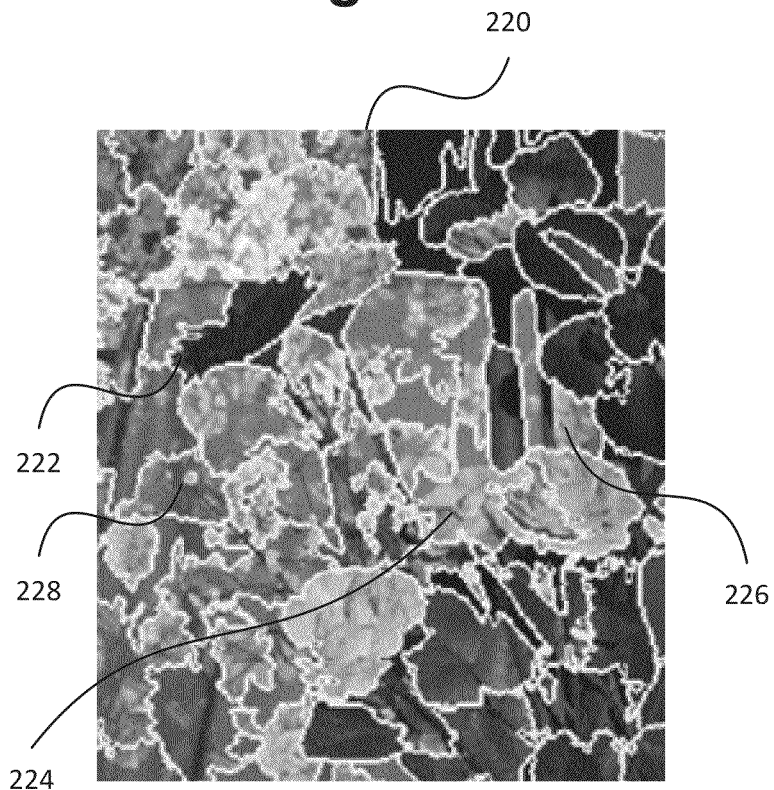

FIG. 2A shows a superpixel segmentation 200 (also referred to as a superpixel representation $S_{rep}$) of the image 100 in FIG. 1A. In an image 220 in FIG. 2B, the segmentation 200 is displayed superimposed on top of the image 100 to highlight the alignment and misalignment of the superpixel boundaries and object edges. The boundaries of most superpixels such as a superpixel 222, align well with object edges.

However, superpixel boundaries are not guaranteed to align with object edges. At depth boundaries where the colour and/or texture are similar across the boundary, a superpixel may include segments of different objects on either side of the boundary. For instance, in a superpixel 224, a flower in the foreground has combined with similarly coloured patches in the background to form one superpixel.

Another problem with superpixel segmentation is that fine structures such as hair strands, flower stems, etc, in an image that are of a scale finer than the superpixels, are combined with other objects to form a superpixel and the fine structures cannot then be separated. For instance, in a superpixel 226, a section of a thin flower stem in the foreground is combined with the background to form one superpixel while in a superpixel 228, some very thin flower stems and tiny white flowers are incorporated into one large superpixel that contains mostly a fragment of a floral drape in the background.

Image Matting

It is possible to correct at least some of the superpixel segmentation errors and recover some of the thin structures through image matting. Image matting attempts to separate the foreground objects of an image from its background. It involves the estimation of an alpha matte $A_m$ which specifies the full or partial pixel coverage of the background by foreground objects. An image, I can be represented as a composition of a foreground image, F, and a background image, B, such that the colour value of a pixel p is given by $$I_p = \alpha_p F_p + (1-\alpha_p) B_p \quad (2)$$

where $\alpha_p$ is the alpha value of the pixel p (in the alpha matte) and is in the range [0, 1], and $F_p$, $B_p$ are the colour values of the foreground image, F, and the background image, B, at pixel p, respectively.

For image matting to be successful, a trimap is defined which assigns all problematic superpixels (that is, superpixels that contain segmentation errors and/or thin structures) to the unknown regions of the trimap. However, selecting different subsets of the superpixels for the three regions of a trimap produces a suboptimal trimap at superpixel scale for reasons set out below. This is the case even if all problematic superpixels are assigned correctly to the unknown region of the trimap.

A problematic superpixel may contain a large number of pixels that are far away from the foreground/background boundaries of the input binary depth map. Its internal pixels may also be at a considerable distance from the edges of the superpixel. Including all the pixels of a problematic superpixel in the unknown region of a trimap and computing their alpha value increases computation cost. At the same time, the alpha value computed for an unknown pixel (this is, a pixel in the unknown region) is less accurate. This is because computing the alpha value requires knowledge of the true foreground and background colours that combined to form the colour of the unknown pixel in the image. For an unknown pixel, its true foreground and background colours can only be estimated from nearby pixels in the foreground and background regions. Hence, the wider the unknown region, the further the unknown pixel is from the foreground and background samples and the less accurate the estimated alpha value.

The SSIMDR Arrangement

To resolve the above issues, the present SSIMDR arrangement automatically generates a trimap, also known as an intersection map, at sub-superpixel scale by splitting some superpixels between the foreground and unknown regions and some superpixels between the background and unknown regions. This creates a trimap with a tighter (or narrower) unknown region improving image matting accuracy, producing better refined depth maps and, at the same time, lowering the computation requirements.

Figure 8A:
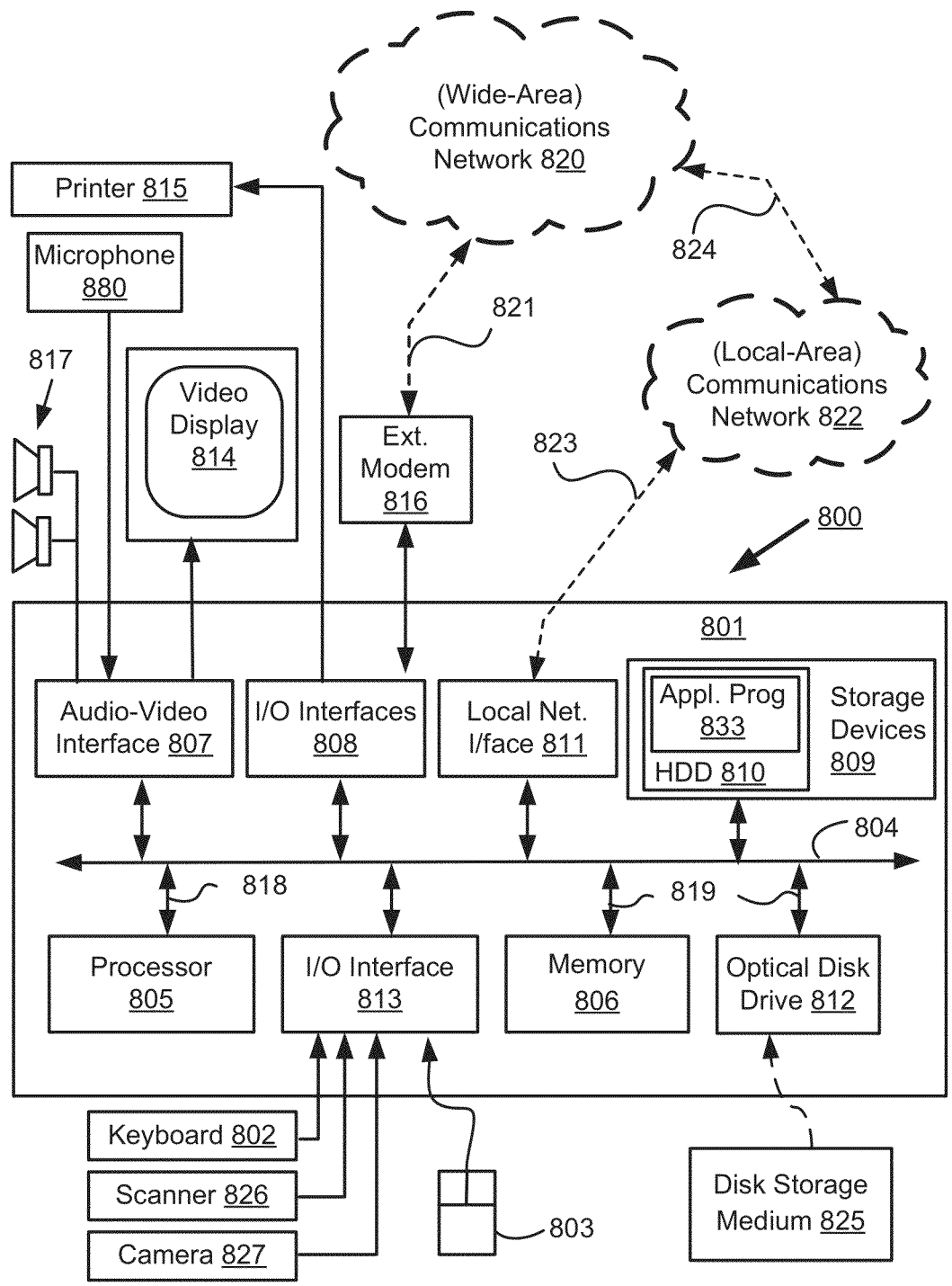
FIGS. 8A and 8B form a schematic block diagram of a general purpose computer system upon which arrangements described can be practiced.
Figure 8B:
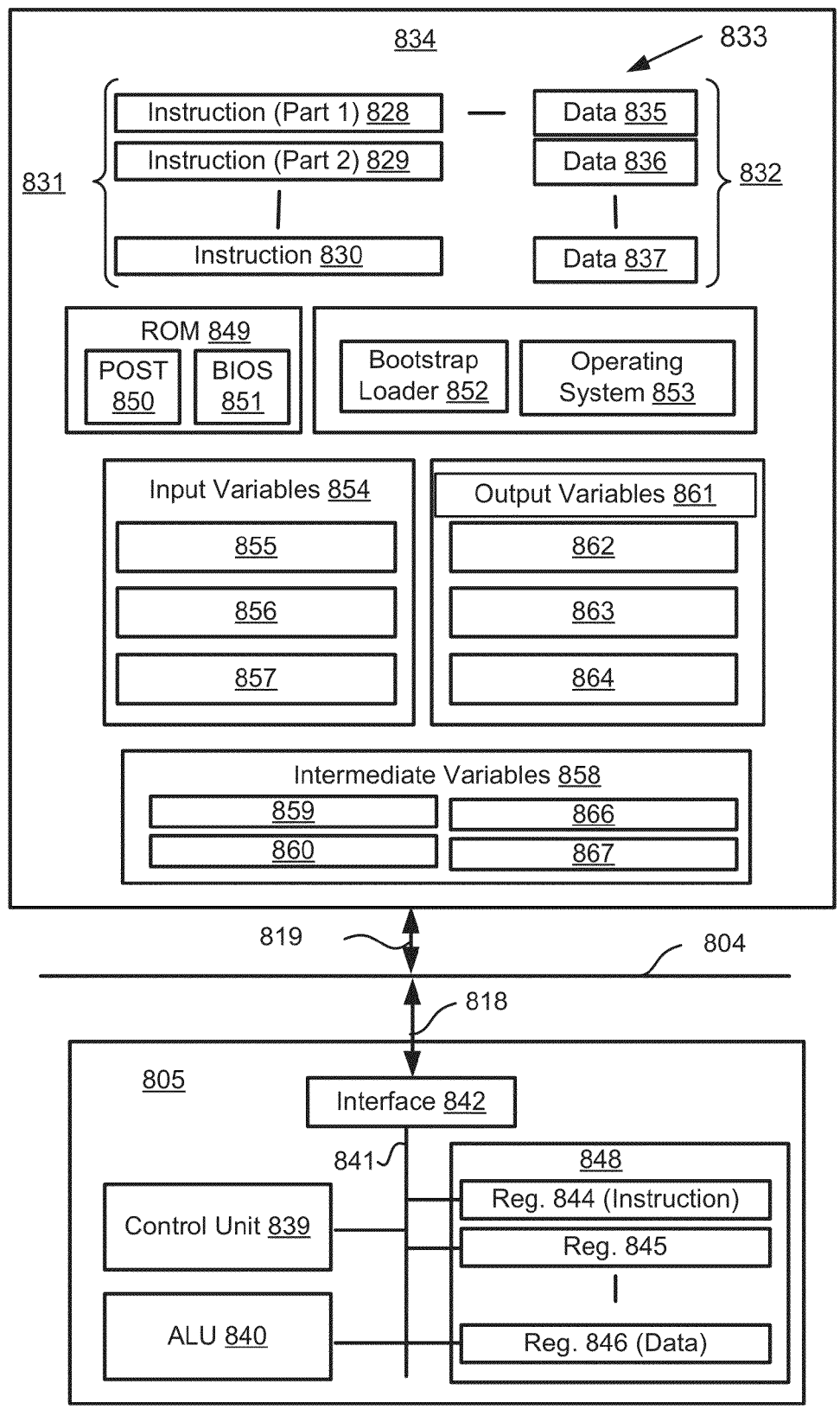

FIGS. 8A and 8B depict a general-purpose computer system 800, upon which the various SSIMDR arrangements described can be practiced.

As seen in FIG. 8A, the computer system 800 includes: a computer module 801; input devices such as a keyboard 802, a mouse pointer device 803, a scanner 826, a camera 827, and a microphone 880; and output devices including a printer 815, a display device 814 and loudspeakers 817. An external Modulator-Demodulator (Modem) transceiver device 816 may be used by the computer module 801 for communicating to and from a communications network 820 via a connection 821. The communications network 820 may be a wide-area network (WAN), such as the Internet, a cellular telecommunications network, or a private WAN. Where the connection 821 is a telephone line, the modem 816 may be a traditional "dial-up" modem. Alternatively, where the connection 821 is a high capacity (e.g., cable) connection, the modem 816 may be a broadband modem. A wireless modem may also be used for wireless connection to the communications network 820.

The computer module 801 typically includes at least one processor unit 805, and a memory unit 806. For example, the memory unit 806 may have semiconductor random access memory (RAM) and semiconductor read only memory (ROM). The computer module 801 also includes an number of input/output (I/O) interfaces including: an audio-video interface 807 that couples to the video display 814, loudspeakers 817 and microphone 880; an I/O interface 813 that couples to the keyboard 802, mouse 803, scanner 826, camera 827 and optionally a joystick or other human interface device (not illustrated); and an interface 808 for the external modem 816 and printer 815. In some implementations, the modem 816 may be incorporated within the computer module 801, for example within the interface 808. The computer module 801 also has a local network interface 811, which permits coupling of the computer system 800 via a connection 823 to a local-area communications network 822, known as a Local Area Network (LAN). As illustrated in FIG. 8A, the local communications network 822 may also couple to the wide network 820 via a connection 824, which would typically include a so-called "firewall" device or device of similar functionality. The local network interface 811 may comprise an Ethernet circuit card, a Bluetooth® wireless arrangement or an IEEE 802.11 wireless arrangement; however, numerous other types of interfaces may be practiced for the interface 811.

The I/O interfaces 808 and 813 may afford either or both of serial and parallel connectivity, the former typically being implemented according to the Universal Serial Bus (USB) standards and having corresponding USB connectors (not illustrated). Storage devices 809 are provided and typically include a hard disk drive (HDD) 810. Other storage devices such as a floppy disk drive and a magnetic tape drive (not illustrated) may also be used. An optical disk drive 812 is typically provided to act as a non-volatile source of data. Portable memory devices, such optical disks (e.g., CD-ROM, DVD, Blu ray Disc™), USB-RAM, portable, external hard drives, and floppy disks, for example, may be used as appropriate sources of data to the system 800.

The components 805 to 813 of the computer module 801 typically communicate via an interconnected bus 804 and in a manner that results in a conventional mode of operation of the computer system 800 known to those in the relevant art. For example, the processor 805 is coupled to the system bus 804 using a connection 818. Likewise, the memory 806 and optical disk drive 812 are coupled to the system bus 804 by connections 819. Examples of computers on which the described arrangements can be practised include IBM-PC's and compatibles, Sun Sparcstations, Apple Mac™ or a like computer systems.

Figure 3:
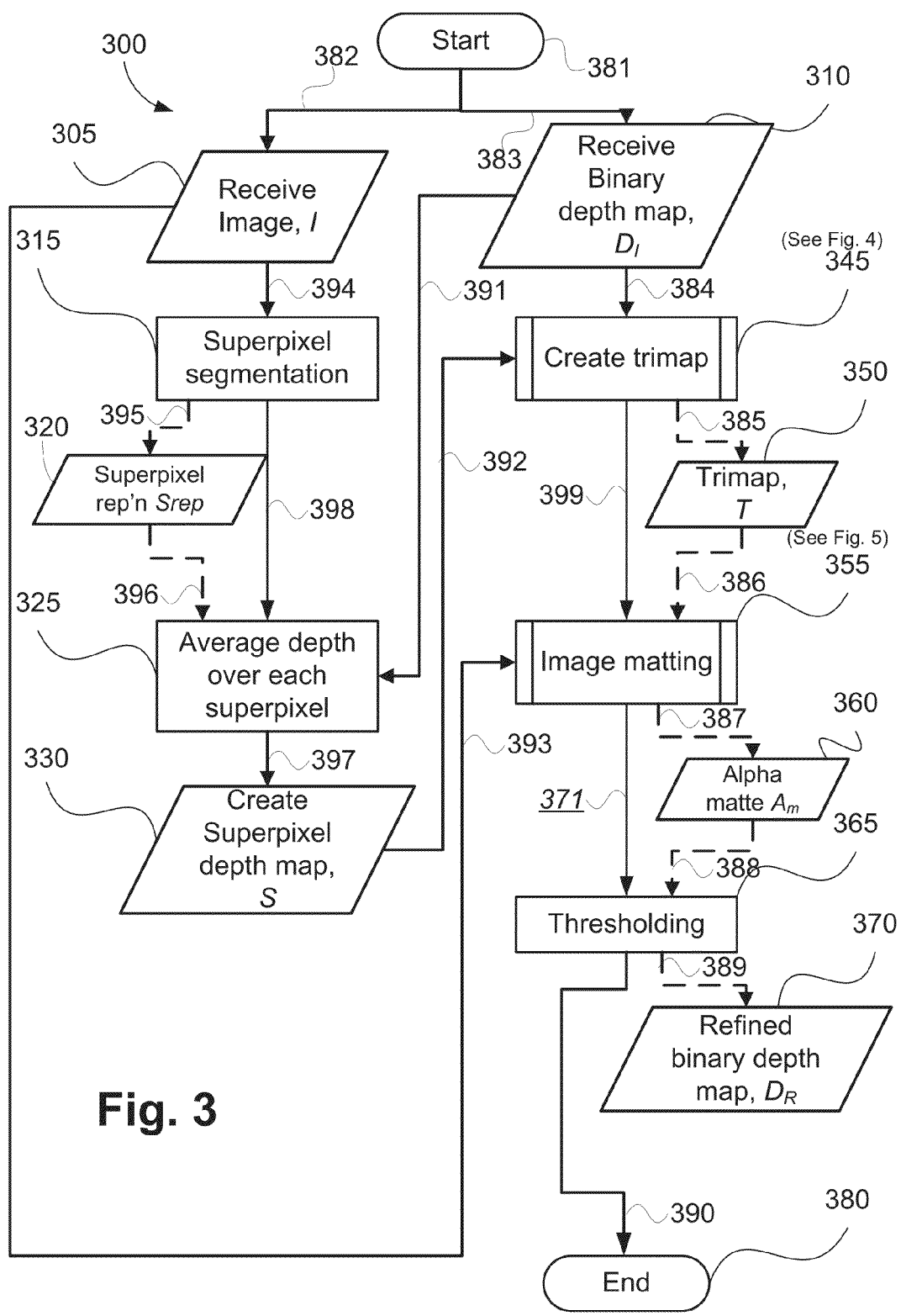
FIG. 3 is a schematic flow diagram illustrating an example of a depth refinement method that generates a sub-superpixel scale depth-constrained adaptive trimap using superpixel segmentation and then applies image matting to refine the depth map, according to the present disclosure.
Figure 4:
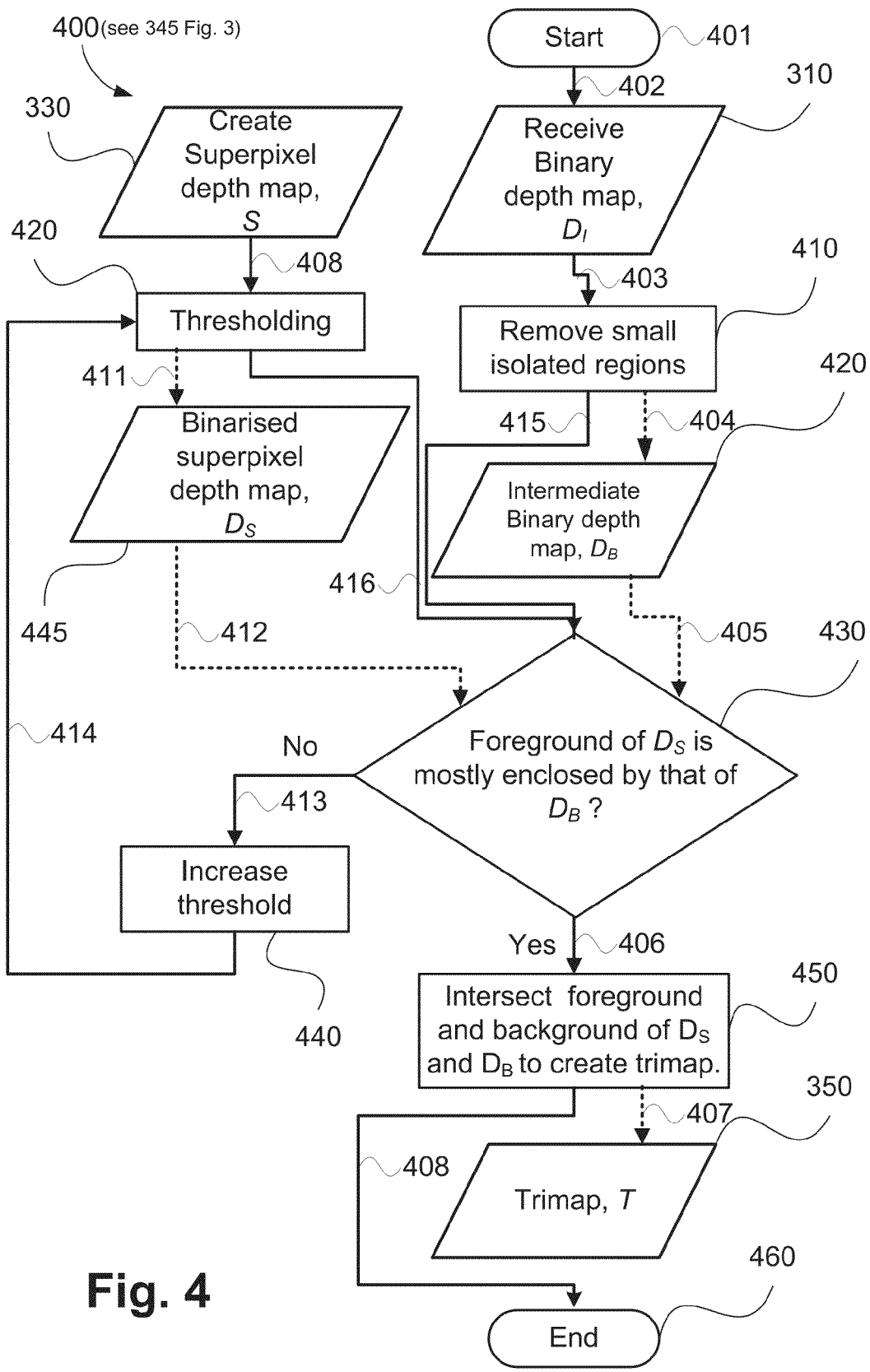
FIG. 4 is a schematic flow diagram illustrating an example of a method for creating a sub-superpixel scale depth-constrained adaptive trimap for image matting as used in the method of FIG. 3.
Figure 5:
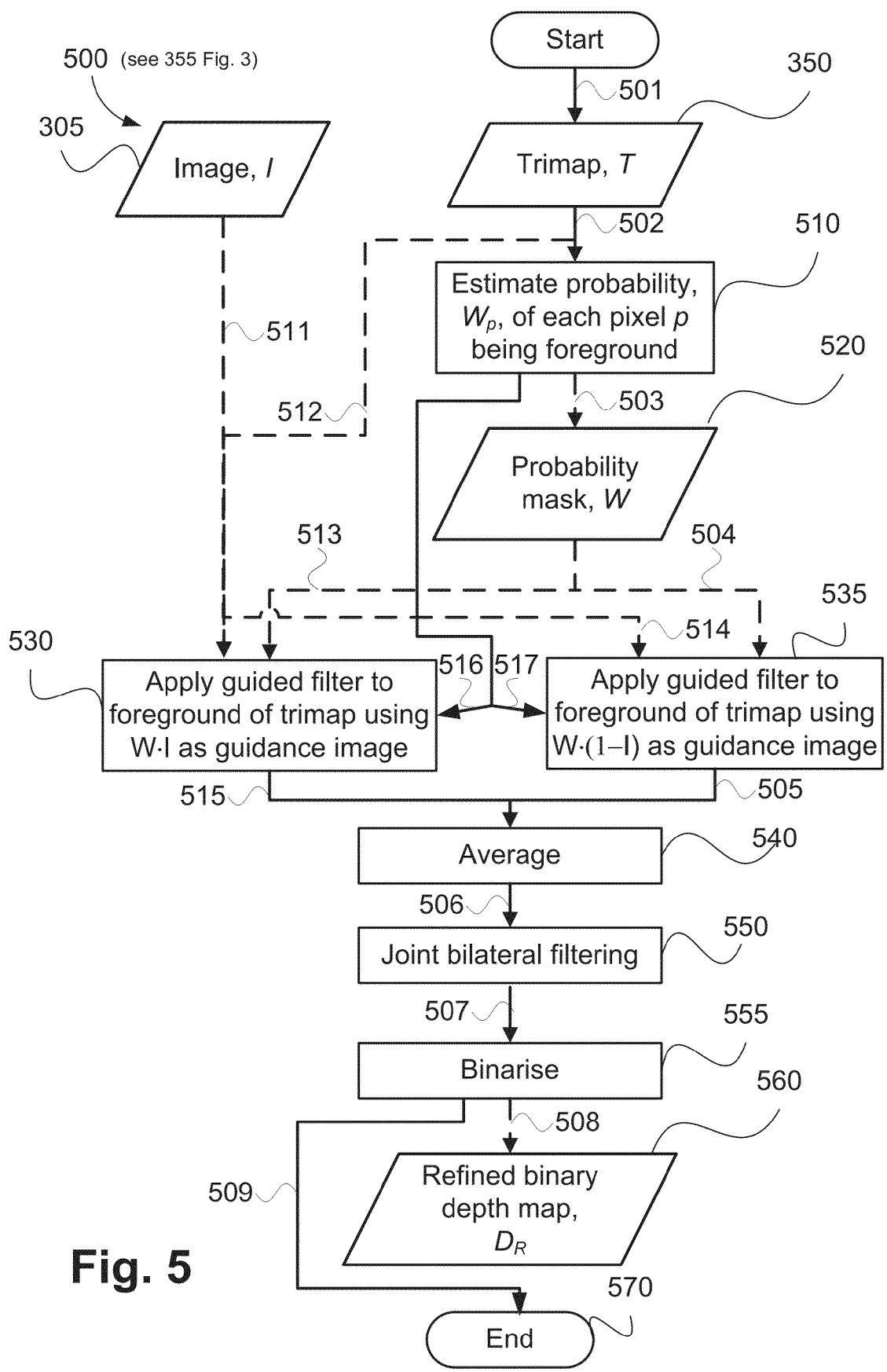
FIG. 5 is a schematic flow diagram illustrating one example of a guided filter based image matting method as used in the method of FIG. 3.

The SSIMDR method may be implemented using the computer system 800 wherein the processes of FIGS. 3-5, to be described, may be implemented as one or more software application programs 833 configured to direct operation of the processor 805 and thus be executable within the computer system 800. In particular, the steps of the SSIMDR method are effected by instructions 831 (see FIG. 8B) in the software 833 that are carried out within the computer system 800. The software instructions 831 may be formed as one or more code modules, each for performing one or more particular tasks. The software may also be divided into two separate parts, in which a first part and the corresponding code modules performs the SSIMDR methods and a second part and the corresponding code modules manage a user interface between the first part and the user.

The software may be stored in a computer readable medium, including the storage devices described below, for example. The software is loaded into the computer system 800 from the computer readable medium, and then executed by the computer system 800. A computer readable medium having such software or computer program recorded on the computer readable medium is a computer program product. The use of the computer program product in the computer system 800 preferably effects an advantageous apparatus for performing the SSIMDR method.

The software 833 is typically stored in the HDD 810 or the memory 806. The software is loaded into the computer system 800 from a computer readable medium, and executed by the computer system 800. Thus, for example, the software 833 may be stored on an optically readable disk storage medium (e.g., CD-ROM) 825 that is read by the optical disk drive 812. A computer readable medium having such software or computer program recorded on it is a computer program product. The use of the computer program product in the computer system 800 preferably effects an apparatus for performing the SSIMDR method.

In some instances, the application programs 833 may be supplied to the user encoded on one or more CD-ROMs 825 and read via the corresponding drive 812, or alternatively may be read by the user from the networks 820 or 822. Still further, the software can also be loaded into the computer system 800 from other computer readable media. Computer readable storage media refers to any non-transitory tangible storage medium that provides recorded instructions and/or data to the computer system 800 for execution and/or processing. Examples of such storage media include floppy disks, magnetic tape, CD-ROM, DVD, Blu-Ray™ Disc, a hard disk drive, a ROM or integrated circuit, USB memory, a magneto-optical disk, or a computer readable card such as a PCMCIA card and the like, whether or not such devices are internal or external of the computer module 801. Examples of transitory or non-tangible computer readable transmission media that may also participate in the provision of software, application programs, instructions and/or data to the computer module 801 include radio or infra-red transmission channels as well as a network connection to another computer or networked device, and the Internet or Intranets including e-mail transmissions and information recorded on Websites and the like.

The second part of the application programs 833 and the corresponding code modules mentioned above may be executed to implement one or more graphical user interfaces (GUIs) to be rendered or otherwise represented upon the display 814. Through manipulation of typically the keyboard 802 and the mouse 803, a user of the computer system 800 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 817 and user voice commands input via the microphone 880.

FIG. 8B is a detailed schematic block diagram of the processor 805 and a "memory" 834. The memory 834 represents a logical aggregation of all the memory modules (including the HDD 809 and semiconductor memory 806) that can be accessed by the computer module 801 in FIG. 8A.

When the computer module 801 is initially powered up, a power-on self-test (POST) program 850 executes. The POST program 850 is typically stored in a ROM 849 of the semiconductor memory 806 of FIG. 8A. A hardware device such as the ROM 849 storing software is sometimes referred to as firmware. The POST program 850 examines hardware within the computer module 801 to ensure proper functioning and typically checks the processor 805, the memory 834 (809, 806), and a basic input-output systems software (BIOS) module 851, also typically stored in the ROM 849, for correct operation. Once the POST program 850 has run successfully, the BIOS 851 activates the hard disk drive 810 of FIG. 8A. Activation of the hard disk drive 810 causes a bootstrap loader program 852 that is resident on the hard disk drive 810 to execute via the processor 805. This loads an operating system 853 into the RAM memory 806, upon which the operating system 853 commences operation. The operating system 853 is a system level application, executable by the processor 805, to fulfil various high level functions, including processor management, memory management, device management, storage management, software application interface, and generic user interface.

The operating system 853 manages the memory 834 (809, 806) to ensure that each process or application running on the computer module 801 has sufficient memory in which to execute without colliding with memory allocated to another process. Furthermore, the different types of memory available in the system 800 of FIG. 8A must be used properly so that each process can run effectively. Accordingly, the aggregated memory 834 is not intended to illustrate how particular segments of memory are allocated (unless otherwise stated), but rather to provide a general view of the memory accessible by the computer system 800 and how such is used.

As shown in FIG. 8B, the processor 805 includes a number of functional modules including a control unit 839, an arithmetic logic unit (ALU) 840, and a local or internal memory 848, sometimes called a cache memory. The cache memory 848 typically include a number of storage registers 844-846 in a register section. One or more internal busses 841 functionally interconnect these functional modules. The processor 805 typically also has one or more interfaces 842 for communicating with external devices via the system bus 804, using a connection 818. The memory 834 is coupled to the bus 804 using a connection 819.

The application program 833 includes a sequence of instructions 831 that may include conditional branch and loop instructions. The program 833 may also include data 832 which is used in execution of the program 833. The instructions 831 and the data 832 are stored in memory locations 828, 829, 830 and 835, 836, 837, respectively. Depending upon the relative size of the instructions 831 and the memory locations 828-830, a particular instruction may be stored in a single memory location as depicted by the instruction shown in the memory location 830. Alternately, an instruction may be segmented into a number of parts each of which is stored in a separate memory location, as depicted by the instruction segments shown in the memory locations 828 and 829.

In general, the processor 805 is given a set of instructions which are executed therein. The processor 1105 waits for a subsequent input, to which the processor 805 reacts to by executing another set of instructions. Each input may be provided from one or more of a number of sources, including data generated by one or more of the input devices 802, 803, data received from an external source across one of the networks 820, 802, data retrieved from one of the storage devices 806, 809 or data retrieved from a storage medium 825 inserted into the corresponding reader 812, all depicted in FIG. 8A. The execution of a set of the instructions may in some cases result in output of data. Execution may also involve storing data or variables to the memory 834.

The disclosed SSIMDR arrangements use input variables 854, which are stored in the memory 834 in corresponding memory locations 855, 856, 857. The SSIMDR arrangements produce output variables 861, which are stored in the memory 834 in corresponding memory locations 862, 863, 864. Intermediate variables 858 may be stored in memory locations 859, 860, 866 and 867.

Referring to the processor 805 of FIG. 8B, the registers 844, 845, 846, the arithmetic logic unit (ALU) 840, and the control unit 839 work together to perform sequences of micro-operations needed to perform "fetch, decode, and execute" cycles for every instruction in the instruction set making up the program 833. Each fetch, decode, and execute cycle comprises:

a fetch operation, which fetches or reads an instruction 831 from a memory location 828, 829, 830;

a decode operation in which the control unit 839 determines which instruction has been fetched; and an execute operation in which the control unit 839 and/or the ALU 840 execute the instruction.

Thereafter, a further fetch, decode, and execute cycle for the next instruction may be executed. Similarly, a store cycle may be performed by which the control unit 839 stores or writes a value to a memory location 832.

Each step or sub-process in the processes of FIGS. 3-5 is associated with one or more segments of the program 833 and is performed by the register section 844, 845, 847, the ALU 840, and the control unit 839 in the processor 805 working together to perform the fetch, decode, and execute cycles for every instruction in the instruction set for the noted segments of the program 833.

The SSIMDR method may alternatively be implemented in dedicated hardware such as one or more integrated circuits performing the SSIMDR functions or sub functions. Such dedicated hardware may include graphic processors, digital signal processors, or one or more microprocessors and associated memories.

FIG. 3 depicts an overall process 300 for performing the present SSIMDR arrangement. The method 300 commences with a start step 381. Following an arrow 382, the computer system 800 receives an image I (eg see 610 in FIG. 6) in a step 305. Following an arrow 383, the computer system 800 receives in a step 310 an associated low-resolution binary (foreground/background) depth map $D_I$ of the image I, (eg see 620 in FIG. 6) from an external data source (not shown) over the network 820, or from data stored on the disk storage medium 825, or from a software program executing on the computer 801.

The binary depth map $D_I$ may be created from two or more images of a scene taken with different camera settings using a passive depth estimate method such as the Gabor Spectral Ratio depth-from-defocus (DFD) method of a related patent application "Determining a depth map from images of a scene". The Gabor Spectral Ratio DFD method computes the ratio of the Gabor responses of corresponding tiles from two input images. For each pair of tiles, a phase check is performed on the Gabor ratio to select only those frequency components whose phase are close to zero to remove noisy components. A parabola is then fitted to the selected frequency components and the curvature of the fitted parabola is used as a depth score for the tile. The resulting depth map which consists of depth scores from various tiles across an image is continuous.

A depth map with continuous depth values can be converted to a multi-level depth map (an example of which is a binary depth map) by thresholding at pre-defined or dynamically determined depth values.

The image I is one of the images used for creating the binary depth map $D_I$. However, the binary depth map $D_I$ is created independently of the superpixel segmentation carried out on the image I in a step 315, as discussed below. Accordingly, the various boundaries and edges in the binary depth map $D_I$ are determined without reference to the superpixel determination step 315 or resultant superpixels in a superpixel representation $S_{rep}$ (ie 320), described hereinafter in more detail below. It is this independence which ultimately enables the creation of a trimap at sub-superpixel scale according to the SSIMDR arrangement.

Figure 6:
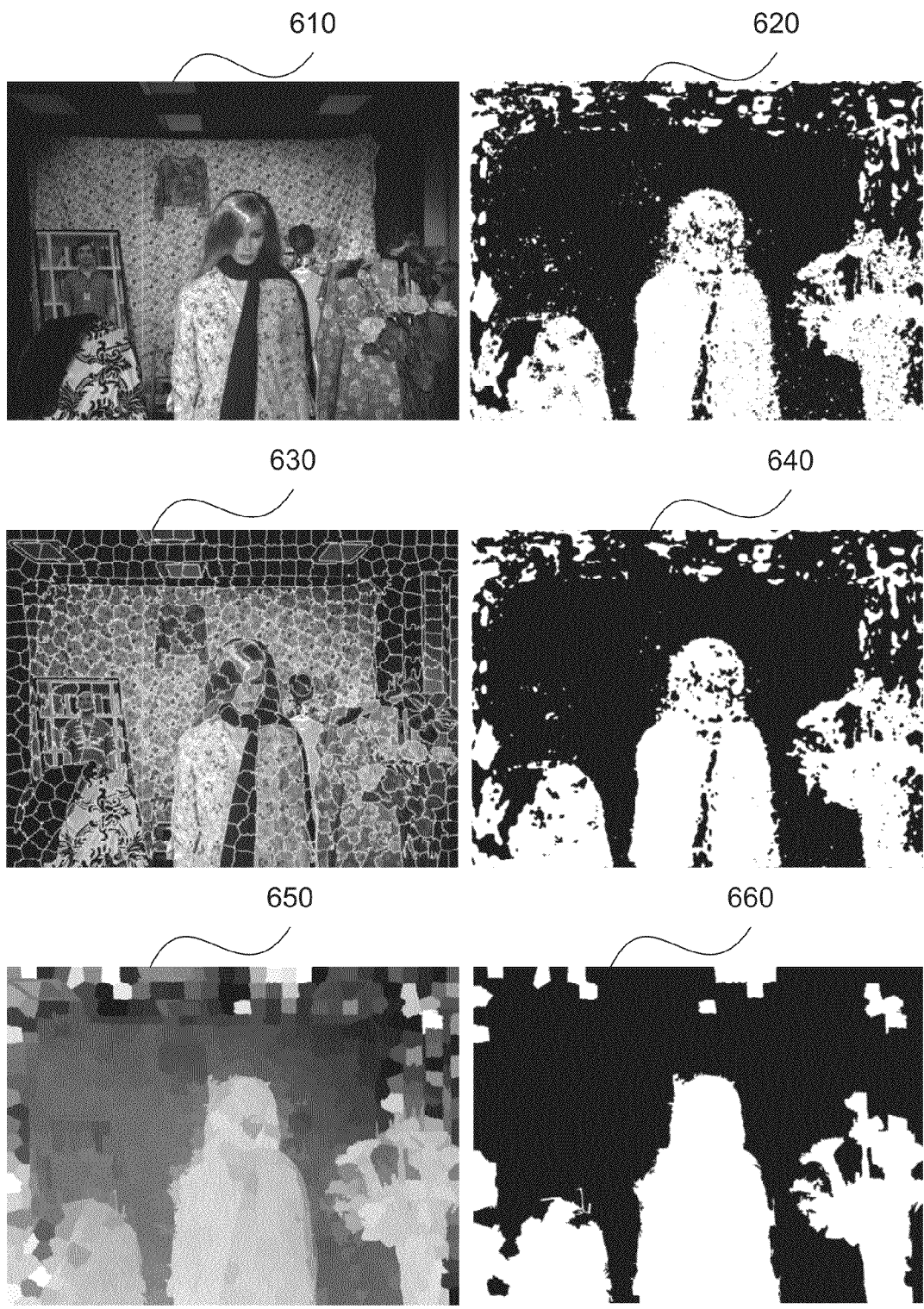
FIG. 6 illustrates an example image, its binary depth map, its superpixel segmentation and other intermediate binary depth maps that are used to generate the example trimaps of FIG. 7.

Following an arrow 394, in a step 315, the image I is segmented, by the processor 805 executing the SSIMDR software program 833, using a superpixel segmentation method, into a set of superpixels forming a superpixel representation $S_{rep}$ (ie 320) (eg see 630 in FIG. 6). In one SSIMDR arrangement, the "SLIC Superpixels" algorithm of Achanta et al. (Achanta R., Shaji A., Smith K., Lucchi A., Fua P. and Süsstrunk S., "SLIC Superpixels", École Polytechnique Fédérale de Lausanne (EPFL) Technical Report 149330, June 2010) is used to segment the image I into the set of superpixels forming the superpixel representation $S_{rep}$ (ie 320). The SLIC method initially divided an image evenly into a number of square, non-overlapping superpixels. It then iteratively changes the superpixel assignment of each pixel based on a weighted distance measure that takes into account of how similar the pixel's colour is to those of the pixels of the same superpixel and those of the neighbouring superpixels as well as the pixel's distance from the centre of these superpixels. A proximity parameter is used as a weight that controls the trades off between colour similarity and the compactness of the superpixels. The higher the value of the proximity parameter, the more compact the superpixels are.

The SLIC Superpixels algorithm has the advantages that one can pre-set the approximate number of superpixels in the segmentation as well as the compactness of the superpixels. In the present SSIMDR arrangement, the number of superpixels is set to a value such that, on average, a superpixel has around $125^2 = 15625$ pixels. To allow the superpixels to follow the shape of the objects in an image more closely, the proximity parameter which controls compactness of the superpixels is set to 10.

Following an arrow 398, in a step 325 performed by the processor 805 executing the SSIMDR software program 833, the depth values of the binary depth map $D_I$ (received as depicted by an arrow 391) are averaged over each of the superpixels in the superpixel representation $S_{rep}$ (ie 320) (received as depicted by a dashed arrow 396). Following an arrow 397, a step 330, performed by the processor 805 executing the SSIMDR software program 833, creates a piecewise constant superpixel depth map S in which the pixels of each superpixel is assigned the average depth value of that superpixels.

Following an arrow 392, in a step 345 performed by the processor 805 executing the SSIMDR software program 833, the superpixel depth map S (received as depicted by an arrow 392) is binarised (ie turned into a binary depth map by thresholding) to form a binarised superpixel depth map $D_S$ which is then intersected with the binary depth map $D_I$ (received as depicted by the arrow 384) to create a trimap T (ie 350). One implementation of the step 345 is described in detail below with reference to FIG. 4. The foreground of the trimap T is the intersection of the foreground of the binary depth map $D_I$ and the binarised superpixel depth map $D_S$. Alternately, the foreground of the trimap T is the intersection of two binary depth maps that are derived from the binary depth map $D_I$ and the binarised superpixel depth map $D_S$. The background of the trimap is the intersection of the background of the same two binary depth maps. The symmetrical difference of the same two binary depth maps forms the unknown region of trimap T. In image processing, the intersection of two set of pixels are the pixels that are contained in both sets while their symmetrical difference are the pixels that are contained in one set but not the other set.

Following an arrow 399, the Trimap T is then used by the processor 805 executing the SSIMDR software program 833, as depicted by a dashed arrow 386, in an image matting step 355 to compute an alpha-matte $A_m$ (ie 360) that contains the alpha value of each pixel of an image. The alpha value is defined to be 1 in the foreground and 0 in the background region of the trimap respectively. Only the alpha value of the pixels in the unknown regions needs to be computed. In one SSIMDR arrangement, a variant of the "Guided Feathering" method of He et al. (He K., Sun J. and Tang X., "Guided image filtering". In *Proceedings of the 11th European Conference on Computer Vision ECCV'10*, Crete, Greece, September 2010, pp. 1-14) is used to create the alpha matte 360. Guided Feathering applies a guided filter to a binary mask under the guidance of an associated image to compute an alpha matte. For each local tile of a binary depth map, the guided filter output is equated to a linear function of the pixel intensity in the corresponding tile of the guidance image. The local filter parameters are found by minimising the mean squared error between the filtered and input depth data. A pixel will be involved in multiple local tiles. The output values from all associated local tiles are averaged to give the pixel its final output depth value. The edge-preserving property of guided filters and the existence of a fast implementation make the method advantageous.

In the step 355, the foreground of the trimap T (provided via the dashed arrow 386) is used as the binary mask for Guided Feathering and the input image I (provided via an arrow 393) is used as the guidance image. One implementation of the step 355 is described in detail below with reference to FIG. 5.

Finally, following an arrow 371, a refined binary depth map $D_R$ is obtained by the processor 805 executing the SSIMDR software program 833 in a step 365 by thresholding the alpha matte $A_m$ (ie 360). In one SSIMDR arrangement, a pre-defined threshold of 0.5 is used. In another SSIMDR arrangement, the threshold is dynamically determined by computing a 256-bins histogram of the alpha matte $A_m$ and setting the threshold to be the global minimum of the histogram.

The process 300 then proceeds, as depicted by an arrow 390, to a stop step 380 and terminates.

Trimap Creation

To generate a trimap at sub-superpixel scale, the present SSIMDR arrangement uses the original binary depth map $D_I$ to limit the extent of the unknown region of the trimap T.

FIG. 4 shows a detailed flow chart of an example 400 of the trimap creation step 345 of FIG. 3.

The trimap creation sub-process 400, receives the binary depth map $D_I$ of the image in the step 310, and receives the piecewise constant superpixel depth map S in the step 330. Since the binary depth map $D_I$ is typically very noisy, following an arrow 403, in a step 410 performed by the processor 805 executing the SSIMDR software program 833, small isolated regions in the binary depth map $D_I$, are removed to form, as depicted by a dotted arrow 404, an intermediate binary depth map $D_B$ (ie 420).

In one SSIMDR arrangement, this is achieved by applying morphological erosion followed by geodesic dilation to the depth map $D_I$ using the depth map $D_I$ itself as a mask to constrain the geodesic dilation and a disk with a radius 2 pixels as a structuring element. That is, $$D_B = ((D_I \ominus E_4) \oplus E_4) \cap D_I \qquad (3)$$

where $D_B$ is the intermediate binary depth map, $D_I$ is the binary depth map, $\ominus$ is the morphological erosion operator, $E_4$ is the structuring element, $\oplus$ is the morphological dilation operator, and $\cap$ is the intersection operator. Morphological erosion and dilation are two basic operations of mathematical morphology. Morphological operations move a structure element such as a small disk across a binary image. The pixel at the origin of the structure element is set to 1 (ie foreground) or 0 (ie background) depending on the morphological operator and the value of the pixels covered by the structuring element. With morphological erosion, the pixel is set to the minimum value of all of the pixels covered by the structuring elements. With morphological dilation, the pixel is set to the maximum value of all the pixels covered by the structuring elements. In other words, morphological erosion erodes away the boundaries of foreground pixels while morphological dilation enlarges the areas of the foreground pixels. Geodesic dilation applies erosion and then dilation to a binary image, and intersects the resulting image with the input image to ensure the foreground pixels of the final output image lay within the foreground pixels of the input image.

In another SSIMDR arrangement, the removal of small isolated regions is achieved by performing median filtering with a 5×5 square kernel.

Following an arrow 408, in a step 420 performed by the processor 805 executing the SSIMDR software program 833, the superpixel depth map S is converted as depicted by a dotted arrow 411 into a binary superpixel depth map $D_S$ (ie 445) by thresholding.

In one SSIMDR arrangement, a threshold is obtained in the following manner:

1. compute a 256-bin depth histogram of $D_S$,
2. if there are bins with zero count, interpolate the non-zero bins using cubic spline interpolation to obtain a continuous curve,
3. smooth the curve with a moving-average filter using a moving window of 16 data points to obtain a final superpixel depth map binarisation curve $C_S$, and
4. set the threshold to the depth value of the global minimum of $C_S$.

Following an arrow 416, in a step 430 performed by the processor 805 executing the SSIMDR software program 833, the foreground of $D_B$ (ie $FG(D_B)$), provided as depicted by a dotted arrow 405, and the foreground of $D_S$ (ie $FG(D_S)$), provided as depicted by a dotted arrow 412, are compared to see if the foreground of $D_S$ is lay mostly (more than two-thirds) within the outer-boundaries of the foreground of $D_B$ (that is, ignoring any holes enclosed by the foreground of $D_B$) to determine if the binarisation threshold for $D_S$ has to be adjusted. While superpixel segmentation errors may cause a small number of the superpixels in the foreground of $D_S$ to protrude beyond the foreground boundaries of $D_B$, the binarisation threshold for $D_S$ is considered satisfactory if most foreground superpixels of $D_S$ lay within the outer boundaries of the foreground of $D_B$.

If it is determined in the step 430 that it is not true that the foreground of $D_S$ is mostly enclosed by the foreground of $D_B$, then control is transferred, as depicted by a "NO" arrow 413, to a step 440. In the step 440, performed by the processor 805 executing the program 833, the threshold is increased to reduce the number of superpixels assigned to the foreground of $D_S$. The threshold is increased by setting its value to the depth value of the local minimum with the next higher depth value in the superpixel depth map binarisation curve $C_S$. The process 400 then follows an arrow 414 to the step 420, performed by the processor 805 executing the program 833, which then applies the higher threshold to create a new binarised superpixel depth binary depth map 445, $D_S$.

If it is determined in the step 430 that the foreground of $D_S$ is mostly enclosed by the foreground of $D_B$, then maintaining a present value of the threshold, control is transferred, as depicted by a "YES" arrow 406, to a step 450. In the step 450, performed by the processor 805 executing the program 833, the foreground and background of $D_B$ and $D_S$ are intersected to create a trimap 350, T. The foreground FG(T) of the trimap T (ie 350) is the intersection of the foreground of the two binary depth maps $D_B$ and $D_S$, the intersection of the foreground of the two binary depth maps $D_B$ and $D_S$ thus being referred to as common foreground. The background of the trimap T is the intersection of the backgrounds of $D_B$ and $D_S$, the intersection of the background of the two binary depth maps $D_B$ and $D_S$ thus being referred to as common background The symmetrical difference of the $D_B$ and $D_S$ forms the unknown region of trimap 350.

The aforementioned operations can be represented mathematically as follows:

$$FG(T)=FG(D_B) \cap FG(D_S) \quad (4)$$

$$BG(T)=BG(D_B) \cap BG(D_S) \quad (5)$$

$$\text{unknown}(T)=(FG(D_B) \cap \sim FG(D_S)) \cup (\sim FG(D_B) \cap FG(D_S)) \quad (6)$$

where FG (•) and BG (•) denotes the foreground and background region of a bimap or trimap respectively while unknown(•) denotes the unknown region of a trimap.

The intersection of the foregrounds of the two binary depth maps $D_B$ and $D_S$ may be morphologically eroded before forming the foreground of the trimap. The intersection of the backgrounds of the two binary depth maps $D_B$ and $D_S$ may be morphologically eroded before forming the background of the trimap. The eroded portions are then added to the symmetrical difference of the $D_B$ and $D_S$ to form the unknown region. This creates a trimap with a slightly wider unknown region but ensures that there will always be an unknown region in between a foreground and a background region.

Figure 7:
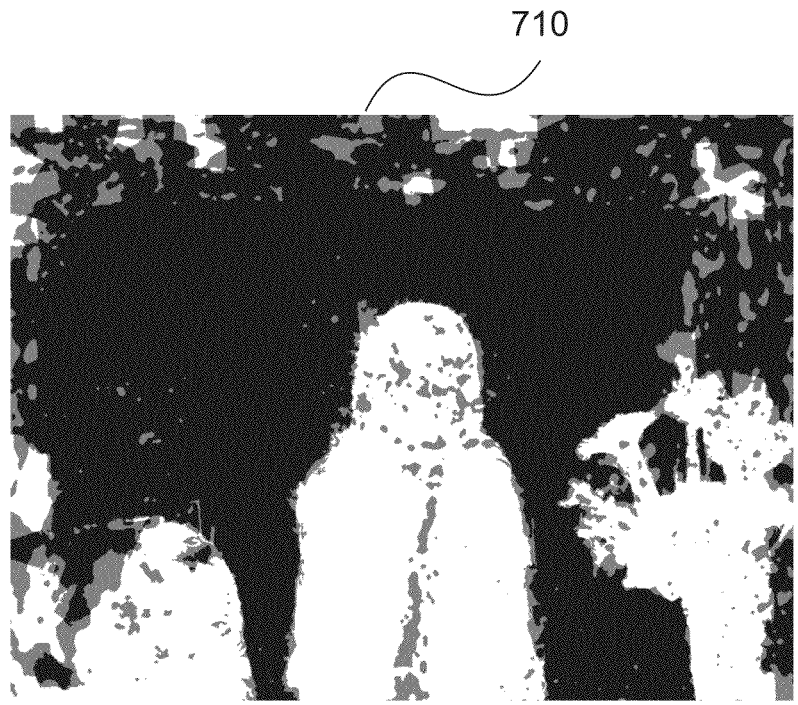
FIG. 7 illustrates an example sub-superpixel scale depth-constrained adaptive trimap created by the described SSIMDR arrangement and compares it to an example superpixel scale trimap created by other means.
Figure 7:
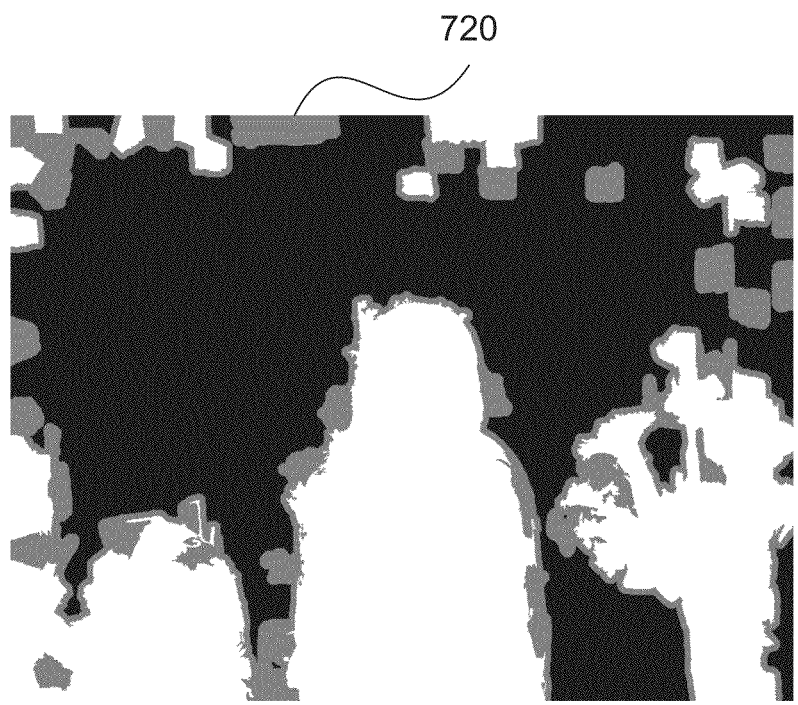

FIG. 6 and FIG. 7 provide an illustrative example of the trimap creation sub-process 400. FIG. 6, shows an image 610 (ie I) and an associated binary (foreground/background) depth map 620 (ie $D_I$) obtained using a depth-from-defocus (DFD) algorithm. The depth map 620 is very noisy, in particular in dark, low-contrast and weakly textured regions. A median filter is applied to remove small isolated regions in the foreground (as described in step 410) to produce a less noisy (intermediate) binary depth map 640 (ie $D_B$).

The SLIC superpixels algorithm is applied to the image 610 (ie I) to produce a superpixel segmentation 630 (ie $S_{rep}$) of the image 610 (ie I). The depth map 620 (ie $D_I$) is averaged over each superpixel (as described in step 325) in $S_{rep}$ to form a piecewise constant superpixel depth map 650 (ie S) which is then thresholded and binarised (as described in step 420) to form a binarised superpixel depth map 660 (ie $D_S$).

Since the binarised superpixel depth map 660 (ie $D_S$) is mostly enclosed by the binary depth map 640 (ie $D_B$), the binarisation threshold (of the superpixel depth map 650, ie S) does not need to be further adjusted and two binary depth maps, 640 and 660 (ie $D_B$ and $D_S$) are then intersected (as described in the step 450) to create the trimap 710 (ie 7) of FIG. 7.

Alternatively, different non-overlapping subsets of the superpixels in the superpixel segmentation 630 (ie $S_{rep}$) can be selected by various heuristics to create a trimap. For example, the trimap 720 T' is created by applying two thresholds, an upper and a lower threshold, to the superpixel depth map 650 (ie S) to selected superpixels for the foreground and background regions of the trimap respectively. The region formed by the selected background superpixels is further (morphologically) eroded before it is assigned to the background region of the trimap 720 T' to ensure that there is always a band of unknown pixels between foreground and background. Regions that are neither in the foreground nor background region are then defined as part of the unknown region.

Comparing the trimap 710 produced by our SSIMDR arrangement to the trimap 720 produced by this second approach, it can be easily seen that the unknown region of 720 is of superpixel scale and are larger than the unknown region of 710 which has sub-superpixel scale. Moreover, the foreground of trimap 720 includes segmentation errors (such as those around the left shoulder and the head of the mannequin) that cannot be corrected by a subsequent image matting step. Hence, the sub-superpixel scale trimap 710 has substantial advantage over the superpixel scale trimap 720.

Guided Filter-Based Image Matting

Trimap 350, T, is used with the image I in the image matting step 355 to compute an alpha-matte $A_m$ (ie 360). In one SSIMDR arrangement, a variant of the "Guided Feathering" method is used. Guided Feathering applies a guided filter to a binary mask under the guidance of an associated image to compute an alpha matte $A_m$. The foreground of the trimap T (ie 350) is used as the binary mask, M, for Guided Feathering and the input image 305, I, is used as the guidance image.

While the original "Guided Feathering" method works well for scenes with foreground objects and backgrounds that are weakly textured and have dissimilar colours, if the foreground and/or background are highly textured, the texture will be transferred to the output depth map $D_R$, thereby corrupting the output depth map $D_R$. The degree of corruption increases as the size of the guided filter kernel increases. To enable Guided Feathering to be used for arbitrary scenes, significant changes, described hereinafter in more detail with reference to FIG. 5, are made to the method to reduce the effect of foreground and background texture on the output depth map.

FIG. 5 shows a detailed flow chart of the variant of the "Guided Feathering" method used in the image matting step 355 of FIG. 3. The image matting sub-process 500, receives as inputs the trimap T (see 350), and the image I (see 305). Following an arrow 502, in a step 510, performed by the processor 805 executing the program 833, a probability $W_p$ that a pixel p is in the foreground is estimated for each pixel in the unknown region of the trimap T. This enables subsequent Guided Feathering steps to be done without referring to the background region of image I and treat the background effectively as textureless. In one SSIMDR arrangement, for each pixel p in the unknown region of T, the probability $W_p$ is computed by performing a comparison of the colour value of a pixel p (instead of the colour value another type of pixel value such as texture value, for example can alternately be used) with the colour values (note previous comment about other types of pixel values) of pixels in the foreground and the background of T within a local window around pixel p according to the following steps:

searching for a pixel u in the foreground of T, FG(T), and a pixel v in the background of T, BG(T) that are spatially closest to p (as measured by their Euclidean distance),
  defining a circular local window Q whose centre is the mid-point between u and v and whose diameter is m (m=16 in the preferred SSIMDR arrangement) pixels larger than the distance between u and v,
  computing the colour distance between p and the foreground pixel in Q and between p and the background pixels in Q using the Euclidean distance in the L*a*b*colour space as colour distance, averaging the colour distance between p and the $k_2$ ($k_2$=8 in the preferred SSIMDR arrangement) foreground pixels and $k_2$ background pixels whose colours are closest to that of p in the L*a*b* colour space to get $\overline{dist_c(p,f)}$ and $\overline{dist_c(p,b)}$ where $dist_c(s,t)$ denotes the colour distance between pixel s and t, and f is any of the $k_2$ foreground pixels and, b any of the $k_2$ background pixels; if there are less than $k_2$ pixels in the foreground or background region of Q, all the foreground or background pixels in Q respectively are used in computing the average, compute the probability $W_p$ as $$W_p = \frac{\overline{dist_c(p, b)}}{\overline{dist_c(p, f)} + \overline{dist_c(p, b)}}. \quad (7)$$

$W_p$ is then set to 1 for all the pixels in the foreground region of the trimap T and 0 for all the pixels in the background region of trimap T to complete a probability mask 520, W, that covers the whole image I.

In a second SSIMDR arrangement, in the step 510, performed by the processor 805 executing the program 833, $k_1$ pixels in the foreground of T, FG (T), and $k_1$ pixels in the background of T, BG(T) that are spatially closest to p are first located. Then, $k_2$ of the $k_1$ ($k_2$<$k_1$) pixels in the foreground and $k_2$ of the $k_1$ pixels in the background whose colours are closest to that of p in the L*a*b* colour space are used to compute the average colour distances and $W_p$.

Following an arrow 516, in a step 530, performed by the processor 805 executing the program 833, a guided filter is applied to FG(T), the foreground of the trimap T, provided as depicted by a dashed arrow 512, using an inner product W·I (that is, the multiplication of corresponding elements of the image 305, I, and the probability mask 502, W, provided by respective dashed arrows 511 and 513), as a guidance image as follows:

$$\hat{D}_{pos} = \text{guide\_filter}(FG(T),(W \cdot I)) \quad (8)$$

where guide_filter(A, B) denotes a guided filtering operation on an input image A using a guidance image B, and $\hat{D}_{pos}$ is the guided filter output for the given input and guidance image;

Following an arrow 517, in a step 535, performed by the processor 805 executing the program 833, a guided filter is applied to FG(T), the foreground of trimap T, provided as depicted by a dashed arrow 514, using an inner product W·Ĩ as a guidance image where Ĩ is the negative image of I and Ĩ=1−I if I is normalised that is the range of its value is from 0 to 1. W and I are provided as depicted by dashed arrows 514 and 504. Mathematically, the operation is defined as follows:

$$\hat{D}_{neg} = \text{guide\_filter}(FG(T),(W \cdot \tilde{I})) \quad (9)$$

where guide_filter(A, B) denotes a guided filtering operation on an input image A using a guidance image B, and $\hat{D}_{neg}$ is the guided filter output for the given input and guidance image.

In both the steps 530 and 535, the regularization parameter of the guided filter (which controls how big the intensity change has to be for an edge to be preserved in the filter output) is preferentially set to the square of ⅟25 of the difference between the maximum intensity and minimum intensity of the image I, while a square guided filter kernel is used with the length of its sides set to two times the maximum distance between the unknown pixels and the foreground and background pixels plus 32 pixels.

The size of the guided filter kernel determines the scale of the fine structures recovered. The smaller the kernel, the finer the structure recovered. Hence, dividing the image into multiple regions based on the width their unknown regions and using guided filter kernels of different sizes in different regions can achieve better recovery of fine structures.

Following arrows 505, 515, in a step 540, performed by the processor 805 executing the program 833, the two guided filter outputs of the step 530 and the step 535 are averaged as follows:

$$\hat{D} = (\hat{D}_{pos} + \hat{D}_{neg})/2 \quad (10)$$

where: $\hat{D}$ is an averaged depth map.

The probability mask W, when multiplied with the image I, masks out the background and reduces the effect of background texture on the guided filter output. However, it also clamps the background of the guidance image to 0 and makes the output of the guided filter dependent on the intensity of the foreground image. The use of both the image I and its negative Ĩ as guidance images and averaging their filter output to provide the averaged depth map $\hat{D}$ cancels out the effect of intensity. It also reduces the effect of foreground texture on the guided filter output. These modifications provide substantial advantage.

Following an arrow 506, in a step 550, performed by the processor 805 executing the program 833, an edge-preserving joint bilateral filter (Kopf J., Cohen M. F., Lischinski D. and Uyttendaele M., "Joint Bilateral Upsampling". ACM Transactions on Graphics, Vol. 26, Issue 3, July 2007; pp. 96-100) is used to smooth the averaged depth map $\hat{D}$ with guidance from the original image 305, I to thereby form the smoothed depth map $D_{sm}$ Joint bilateral filter is an edge-preserving smoothing filter. The value at each pixel of an input image is replaced by a weighted average of the values of nearby pixels. The weights depend on the spatial distance between the pixels and the similarity of the pixels determined on a guidance image.

In one SSIMDR arrangement, the radius of the Gaussian kernels of the joint bilateral filter is set to 4 pixels while the standard deviation σ of the spatial Gaussian kernel is set to half its radius and the standard deviation σ of the (colour) range Gaussian kernel is set to ⅟25 of the difference between the maximum intensity and minimum intensity of image I.

Following an arrow 507, in a step 555, performed by the processor 805 executing the program 833, the smoothed depth map $D_{sm}$ is binarised by thresholding to produce a refined binary depth map 560, $D_R$.

In one SSIMDR arrangement, a pre-defined threshold of 0.5 is used. In another SSIMDR arrangement, the threshold is dynamically determined by computing a 256-bins histogram of the smoothed depth map and setting the threshold to be the global minimum of the histogram.

INDUSTRIAL APPLICABILITY

The arrangements described are applicable to the computer and data processing industries and particularly for the image processing industry, for example, in extracting foreground regions from images.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A method of forming a refined depth map from a high-resolution image of a scene and a low-resolution depth map of said image, said method comprising the steps of:
    segmenting the high-resolution image into a plurality of superpixels, being connected sets of pixels of the high-resolution image, to form a superpixel segmented image;
    determining at least one depth measure associated with the superpixels in the superpixel segmented image to thereby form a superpixel depth map having a foreground region and a background region;
    intersecting the foreground region and the background region of the superpixel depth map with the respective foreground region and the background region of the low-resolution binary depth map to define a trimap having a foreground region, a background region and an unknown region; and
    reclassifying pixels in the unknown region of the trimap as either foreground or background pixels of the trimap based on a comparison of pixel values in the unknown region of the trimap with pixel values in at least one of the foreground region of the trimap and the background region of the trimap, thereby forming said refined depth map.

2. A method according to claim 1, wherein the unknown region of the trimap is at sub-superpixel scale.

3. A method according to claim 1, comprising, prior to the intersecting step, the steps of:
    if a foreground of the superpixel depth map is not substantially enclosed by a foreground of the low-resolution binary depth map, changing a threshold used to form the superpixel depth map to thereby reduce a size of the unknown region of the trimap; and
    if a foreground of the superpixel depth map is substantially enclosed by a foreground of the low-resolution binary depth map, maintaining a present value of the threshold.

4. A method according to claim 1, wherein the step of reclassifying the pixels in the unknown region as either foreground or background comprises the steps of:
    determining a probability mask defining whether pixels in the unknown region of the trimap are in a foreground region of the image; and
    performing guided filtering on the image and a negative of the image using said probability mask.

5. A method according to claim 4, further comprising applying multiple guided filter kernels of different sizes to improve spatial resolution.

6. A method according to claim 1, wherein the comparison of pixel values comprises comparing said pixel values in the unknown region with pixel values in the at least one of the foreground region of the trimap and the background region of the trimap, said pixel values in the unknown region and said pixel values in the at least one of the foreground region of the trimap and the background region of the tri map being in a same superpixel.

7. An apparatus for forming a refined depth map from a high-resolution image of a scene and a low-resolution depth map of said image, said apparatus comprising:
    a processor; and
    a software executable program configured to direct the processor to execute a method comprising the steps of:
        segmenting the high-resolution image into a plurality of superpixels, being connected sets of pixels of the high-resolution image, to form a superpixel segmented image;
        determining at least one depth measure associated with the superpixels in the superpixel segmented image to thereby form a superpixel depth map having a foreground region and a background region;
        intersecting the foreground region and the background region of the superpixel depth map with the respective foreground region and the background region of the low-resolution binary depth map to define a trimap having a foreground region, a background region and an unknown region; and
        reclassifying pixels in the unknown region of the trimap as either foreground or background pixels of the trimap based on a comparison of pixel values in the unknown region of the trimap with pixel values in at least one of the foreground region of the trimap and the background region of the trimap, thereby forming said refined depth map.

8. A non-transitory computer readable medium storing a software executable program configured to direct a processor to execute a method for forming a refined depth map from a high-resolution image of a scene and a low-resolution depth map of said image, said method comprising the steps of:
    segmenting the high-resolution image into a plurality of superpixels, being connected sets of pixels of the high-resolution image, to form a superpixel segmented image;
    determining at least one depth measure associated with the superpixels in the superpixel segmented image to thereby form a superpixel depth map having a foreground region and a background region;
    intersecting the foreground region and the background region of the superpixel depth map with the respective foreground region and the background region of the low-resolution binary depth map to define a trimap having a foreground region, a background region and an unknown region; and
    reclassifying pixels in the unknown region of the trimap as either foreground or background pixels of the trimap based on a comparison of pixel values in the unknown region of the trimap with pixel values in at least one of the foreground region of the trimap and the background region of the trimap, thereby forming said refined depth map.

9. A method of forming a refined depth map of a high-resolution image using a low-resolution depth map of the image, said method comprising the steps of:
    segmenting the high-resolution image into a plurality of superpixels to form a superpixel segmented image, said superpixels being connected sets of pixels of the high-resolution image;
    defining a foreground region and a background region in the superpixel segmented image, to form a superpixel depth map, based on at least one depth measure associated with the superpixels in the superpixel segmented image;
    intersecting the respective foreground regions and the background regions of the superpixel depth map with the low-resolution depth map to define a trimap consisting of a foreground region, a background region and an unknown region, said low-resolution depth map being determined independently of the superpixel segmented image; and
    forming a refined binary depth map of the image from the trimap by reclassifying pixels in the unknown region as either foreground or background based on a comparison of pixel values in the unknown region with pixel values in at least one of of the foreground region of the trimap and the background region of the trimap.

10. A method according to claim 9, wherein the unknown region of the trimap is at sub-superpixel scale.

11. A method according to claim 9, wherein the comparison of pixel values comprises comparing said pixel values in the unknown region with pixel values in the at least one of the foreground region of the trimap and the background region of the trimap, said pixel values in the unknown region and said pixel values in the at least one of the foreground region of the trimap and the background region of the tri map being in a same superpixel.

12. A method according to claim 9, comprising, prior to the intersecting step, the steps of:
if a foreground of the superpixel depth map is not substantially enclosed by a foreground of the low-resolution binary depth map, changing a threshold used to form the superpixel depth map to thereby reduce a size of the unknown region of the trimap; and
if a foreground of the superpixel depth map is substantially enclosed by a foreground of the low-resolution binary depth map, maintaining a present value of the threshold.

13. A method according to claim 9, wherein the step of reclassifying the pixels in the unknown region as either foreground or background comprises the steps of:
determining a probability mask defining whether pixels in the unknown region of the trimap are in a foreground region of the image; and
performing guided filtering on the image and a negative of the image using said probability mask.

14. A method according to claim 13, further comprising applying multiple guided filter kernels of different sizes to improve spatial resolution.

15. An apparatus for forming a refined depth map of a high-resolution image using a low-resolution depth map of the image, said apparatus comprising:
a processor; and
a software executable program configured to direct the processor to execute a method comprising the steps of:
segmenting the high-resolution image into a plurality of superpixels to form a superpixel segmented image, said superpixels being connected sets of pixels of the high-resolution image;
defining a foreground region and a background region in the superpixel segmented image, to form a superpixel depth map, based on at least one depth measure associated with the superpixels in the superpixel segmented image;
intersecting the respective foreground regions and the background regions of the superpixel depth map with the low-resolution depth map, to define a trimap consisting of a foreground region, a background region and an unknown region, said low-resolution depth map being determined independently of the superpixel segmented image; and
forming a refined binary depth map of the image from the trimap by reclassifying pixels in the unknown region as either foreground or background based on a comparison of pixel values in the unknown region with pixel values in at least one of the foreground region of the trimap and the background region of the trimap.

16. A non-transitory computer readable medium storing a software executable program configured to direct a processor to execute a method for forming a refined depth map of a high-resolution image using a low-resolution depth map of the image, said method comprising the steps of:
segmenting the high-resolution image into a plurality of superpixels to form a superpixel segmented image, said superpixels being connected sets of pixels of the high-resolution image;
defining a foreground region and a background region in the superpixel segmented image, to form a superpixel depth map, based on at least one depth measure associated with the superpixels in the superpixel segmented image;
intersecting the respective foreground regions and the background regions of the superpixel depth map with the low-resolution depth map, to define a trimap consisting of a foreground region, a background region and an unknown region, said low-resolution depth map being determined independently of the superpixel segmented image; and
forming a refined binary depth map of the image from the trimap by reclassifying pixels in the unknown region as either foreground or background based on a comparison of pixel values in the unknown region with pixel values in at least one of the foreground region of the trimap and the background region of the trimap.

* * * * *